2,937,159
STABILIZED PHENOL-FORMALDEHYDE RESINS

Arthur F. McKay, Pointe Claire, Quebec, and Ctirad Podesva, Montreal, Quebec, Canada, assignors to Monsanto Canada Limited, Ville La Salle, Quebec, Canada No Drawing. Application December 23, 1957
Serial No. 704,237

4 Claims. (Cl. 260—59)

This invention relates to water-soluble phenolformaldehyde resins.

More specifically it relates to resins of this type having improved storage life over that of similar resins now in existence and in commercial use, and yet whose potential reactivity without being decreased is on the contrary increased. The latter characteristic of these modified resins allows complete curing at lower temperatures and/or shorter curing times than presently required with similar resins now available. The new resins are particularly useful in the plywood industry, for furniture bonding, production of fiber boards and wood chipboards, and for other applications.

With conventional phenol-formaldehyde resins, as everyone familiar with the art recognizes, the stability varies inversely with the reactivity. In other words, both of these desirable properties cannot be improved at the same time. The more reactive phenol-formaldehyde resins are usually prepared by condensing higher ratios of formaldehyde with phenol, and such resins cannot be stored for long periods of time because of their rapid increase in viscosity under normal storage conditions. Resins with lower ratios of formaldehyde can be stored for longer periods of time, but they require longer heating periods for complete curing and therefore their use, e.g., in plywood mills is less economical. Therefore ways have long been sought for improving the reactivity of phenol-formaldehyde resins without adversely affecting their stability on storage.

The applicants have now found that curing times of practically all phenol-formaldehyde aqueous resins can be considerably shortened by treating them with minor quantities of certain aliphatic polyamines and some additional formaldehyde, for example, in the form of paraformaldehyde. The polyamines used in the manner of the invention exercise some complex action which is not yet fully understood, but which is an incident to the applicants' procedure which is described, as follows:

The resins which can be modified according to the invention are phenol-formaldehyde or cresol-formaldehyde resins soluble in water, either resols or novolaks, provided that those latter are soluble in aqueous alkalis. Aqueous resols prepared with phenol:formaldehyde molecular ratio of 1:1–1:2.5 and containing 40–70% solids are the most suitable. They should be cooked to the point where no more free-formaldehyde is present. It is immaterial under what conditions they are prepared and what type of catalyst is used for their preparation. If to these preformed resins are added small amounts of certain polyamines, their storage stability will be increased up to 50%, but their reactivities at elevated temperatures will remain the same, as the reactivity of the unmodified resins. If, however, there is added to the resins, which already contain some free polyamine, some paraformaldehyde, their reactivity will be greatly increased, as represented by very short curing times.

The applicants prefer to keep the free formaldehyde, in the resin treated with polyamine, as low as possible, for example, to one percent or less. If there is free formaldehyde, an additional amount of polyamine must be added to take up the free formaldehyde and to leave an excess of the amount specified herein for stabilizing purposes.

Now, additions of paraformaldehyde are known to increase the reactivities of phenol-formaldehyde resins. However, if there are added equivalent amounts of paraformaldehyde to two resins, one conventional and the other containing small amounts of an aliphatic polyamine, the latter will be considerably more reactive than the former. So that the combination of polyamine-paraformaldehyde is much more efficient in reducing curing times than paraformaldehyde alone.

From the above description it can be seen that by addition to a preformed phenol-formaldehyde resin of some polyamine, and prior to use, of some formaldehyde, we get a unique combination of excellent storage stability and exceptionally high reactivity. It has to be emphasized, however, that the polyamine has to be added to a preformed resin and not to be reacted in during the resin preparation. In the latter case its efficiency for the improvement of storage stability and increased reactivity after the addition of paraformaldehyde would be lost.

The following polyamines are suitable for the purpose of the invention: ethylenediamine, diethylenetriamine, triethylenetetramine, tetraethylenepentamine, propylenediamine, butylenediamine and 3,3'-iminobispropylamine. They are effective when used in amounts of 0.5–10% based on resin solids. Aliphatic or aromatic monoamines, aromatic polyamines or alkylolamines are ineffective for both improvement of storage stability and improved reactivity.

Formaldehyde may be added in the form of aqueous solution or in the form of one of its polymers, e.g., paraformaldehyde. It should be added in such amounts as not to exceed, together with formaldehyde already combined in the resin, the molecular ratio of total formaldehyde to phenol of 3:1 or to cresol of 2:1.

Polyamine-formaldehyde formulations as will be seen from the examples, permits the cure of aqueous resols in a fraction of time normally necessary for their curing. The action of polyamine modification is even more spectacular in the case of novolaks dissolved in diluted aqueous alkalis, where it causes their setting at room temperature. The nature of our invention will be more fully understood from the illustrative examples which follow, which, however, are not considered as restricting the scope of our invention. All parts are by weight.

Example I 2590 parts of phenol was dissolved in 5040 parts of aqueous 37% formaldehyde. Water (430 parts) and 1210 parts of 50% water solution of NaOH was then added and all refluxed with stirring at atmospheric pressure for 65 minutes. Water (1483 parts) and 665 parts of 50% NaOH solution were then added and the resin cooled to room temperature. Its solids content was 42% and the viscosity was 360 centipoises at 70° F. Reactivity expressed as gel time at 100° C. was 36 minutes.

To 100 parts of this resin was added 2 parts of diethylenetriamine and an accelerated storage test run together with an untreated sample, at 145° F. Whereas, the untreated sample gelled in 24 hours, the sample containing the polyamine gelled in 40 hours.

|   | Minutes |
|---|---|
| Original resin | 36 |
| Treated resin | 53 |
| Original resin +4% paraformaldehyde | 12 |
| Treated resin +4% paraformaldehyde | 4.5 |
| Treated resin +8% paraformaldehyde | 3.5 |
| Original resin +12% paraformaldehyde | 4.0 |
| Treated resin +12% paraformaldehyde | 3.0 |

Example II

Phenol (755 parts) was dissolved in 900 parts of 37% aqueous formaldehyde and 285 parts of 50% aqueous NaOH added. After refluxing with stirring at atmospheric pressure for about 90 minutes, 656 parts of water and 181 parts of 50% NaOH were then added and the resin cooled to room temperature. It contained 42% solids and had the viscosity of 96 centipoises at 70° F. No free formaldehyde was detected.

100 parts of this resin was treated with 2 parts of ethylenediamine and accelerated storage test run as in Example I. The untreated sample gelled in 4 days, whereas, the treated one needed 5 days to gel.

Gel times at 100° C.: Minutes
- Original resin _____ 72
- Treated resin _____ 93
- Original resin+8% paraformaldehyde _____ 11
- Treated resin+8% paraformaldehyde _____ 3

Example III 100 parts of the original resin described in Example II was treated with one part of ethylenediamine.

Gel times at 100° C.: Minutes
- Original resin _____ 72
- Treated resin _____ 89
- Original resin+8% paraformaldehyde _____ 11
- Treated resin+8% paraformaldehyde _____ 5
- Original resin+12% paraformaldehyde _____ 6
- Treated resin+12% paraformaldehyde _____ 2

Example IV 100 parts of resin described in Example II was treated with one part of diethylenetriamine.

Gel times at 100° C.: Minutes
- Original resin _____ 72
- Treated resin _____ 97
- Original resin+8% paraformaldehyde _____ 11
- Treated resin+8% paraformaldehyde _____ 5
- Original resin+12% paraformaldehyde _____ 6
- Treated resin+12% paraformaldehyde _____ 4

Example V 100 parts of original resin described in Example II was treated with 2 parts of diethylenetriamine. At the accelerated storage test the untreated resin gelled in 4 days, whereas, the treated sample needed 7 days to gel.

Gel times at 100° C.: Minutes
- Original resin _____ 72
- Treated resin _____ 112
- Original resin+8% paraformaldehyde _____ 11
- Treated resin+8% paraformaldehyde _____ 2.5
- Original resin+12% paraformaldehyde _____ 6
- Treated resin+12% paraformaldehyde _____ 2

Example VI 100 parts of resin described in Example II was treated with 4 parts of triethylenetetramine.

Gel times at 100° C.: Minutes
- Original resin _____ 72
- Treated resin _____ 102
- Original resin+8% paraformaldehyde _____ 11
- Treated resin+8% paraformaldehyde _____ 2.5

Example VII 100 parts of resin described in Example II was treated with 2 parts of tetraethylenepentamine. In the accelerated storage test the treated sample gelled in 5 days whereas, the untreated sample gelled in 4 days.

Gel times at 100° C.: Minutes
- Original resin _____ 72
- Treated resin _____ 89
- Original resin+12% paraformaldehyde _____ 6
- Treated resin+12% paraformaldehyde _____ 2.5

Example VIII 330 parts of phenol was dissolved in 243 parts of 37% aqueous formaldehyde and 267 parts of water added. The solution was acidified with 20 cc. of conc. HCl and refluxed for 90 minutes at atmospheric pressure. After cooling to room temperature the separated novolak was brought back to solution by the addition of 140 parts of aqueous 50% NaOH.

100 parts of this resin was treated with 2 parts of diethylenetriamine and 8 parts of paraformaldehyde. The resin gelled hard in less than an hour.

The original resin treated with equivalent amounts of paraformaldehyde but containing no diethylenetriamine did not set at room temperature.

This application is a continuation-in-part of application Serial Number 513,595, filed June 6, 1955.

We claim:

1. A process of making a modified water-soluble thermosetting phenol-formaldehyde resin syrup comprising cooking together 1.0 mole of phenol with 1.0 to 2.5 moles of formaldehyde in aqueous solution in the presence of an alkaline catalyst to the point where a completely reacted aqueous solution of the resin is formed and substantially all the free formaldehyde has been used up in the reaction, adding further water and alkaline catalyst and without further heating, cooling the resin solution to room temperature, the total amount of water used being so adjusted that the solids content is 40% to 70% of the solution, adding to the completely reacted and cooled resin solution a polyamine selected from the group consisting of ethylenediamine, diethylenetriamine, triethylenetetramine, tetraethylenepentamine, propylenediamine, butylenediamine and 3,3'-aminobispropylamine in the amount of 0.5–10.0 parts by weight per 100 parts by weight of the resin solids, thereby producing a composition possessing an increased storageability as compared with the storageability of the resin in the absence of the addition of the polyamine, as evidenced by the relative times required to produce gelation of the two compositions, measured at 145° F., the gel time of the polyamine containing composition being at least about 1 day greater than the gel time of the untreated resin; storing the resulting composition and thereafter and prior to use, adding to the stored composition, an amount of formaldehyde sufficient to obtain together with the formaldehyde already reacted in the resin a total phenol to formaldehyde molecular ratio not higher than 1:3.

2. A process of making a cold setting water-soluble modified phenol-formaldehyde resin comprising cooking together one mole of phenol and less than one mole of formaldehyde in aqueous solution in the presence of an acidic catalyst to the point where a completely reacted aqueous solution of the resin is formed and substantially all the formaldehyde has been consumed in the reaction, adding alkaline catalyst and further water and without further heating, cooling the resin solution to room temperature, dissolving the resin in dilute alkali with the total amount of water used being so adjusted so as to maintain the solids content between 40% to 70% of the solution, adding to the completely reacted and cooled resin solution a polyamine selected from the group consisting of ethylenediamine, diethylenetriamine, triethylenetetramine, tetraethylenepentamine, propylenediamine, butylenediamine and 3,3'-iminobispropylamine in an amount of 0.5–10.0 parts by weight per 100 parts by weight of the resin solids, thereby producing a composition possessing an increased storageability as compared with the storageability of the resin in the absence of the addition of the polyamine, as evidenced by the relative times required to produce gelation of the two compositions, measured at 145° F., the gel time of the polyamine containing composition being at least about 1 day greater than the gel time of the untreated resin; storing the resulting mixture and prior to the use of same, adding thereto an amount of formaldehyde sufficient to obtain together with the formaldehyde already bound in the resin a total molecular ratio of formaldehyde to phenol not higher than 3:1.

3. A process as defined in claim 1, in which the phenol to be cooked with the formaldehyde is at least partially replaced by a cresol.

4. A process as defined in claim 2, in which the phenol to be cooked with the formaldehyde is at least partially replaced by a cresol.

References Cited in the file of this patent
UNITED STATES PATENTS

| | | |
|---|---|---|
| 2,482,525 | Wachter | Sept. 20, 1949 |
| 2,502,511 | Davies et al. | April 4, 1950 |
| 2,585,196 | Walton | Feb. 12, 1952 |
| 2,699,431 | Harvey et al. | Jan. 11, 1955 |